Patented Sept. 30, 1924.

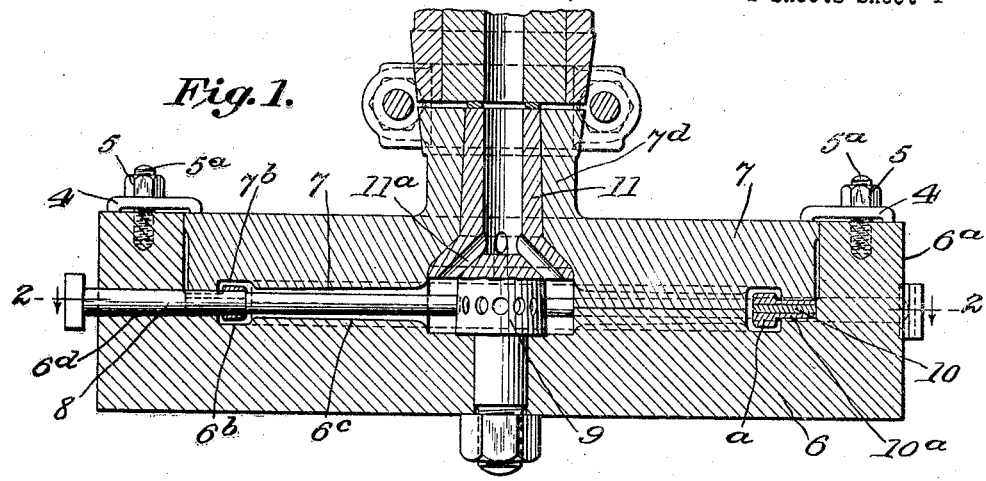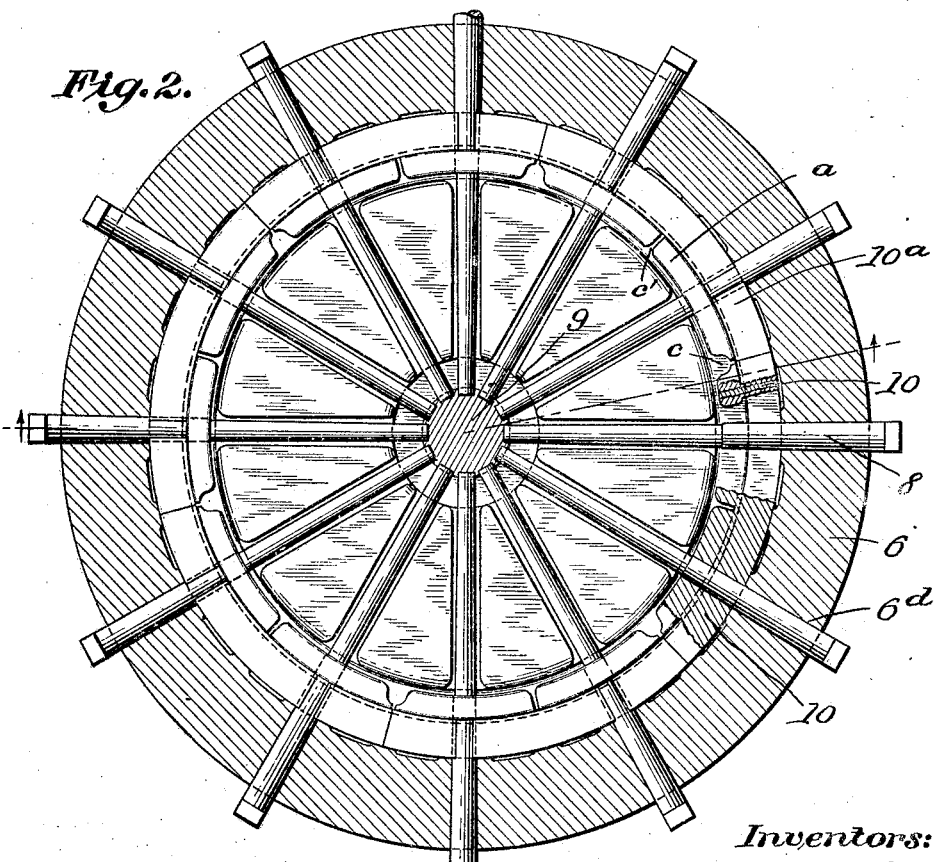

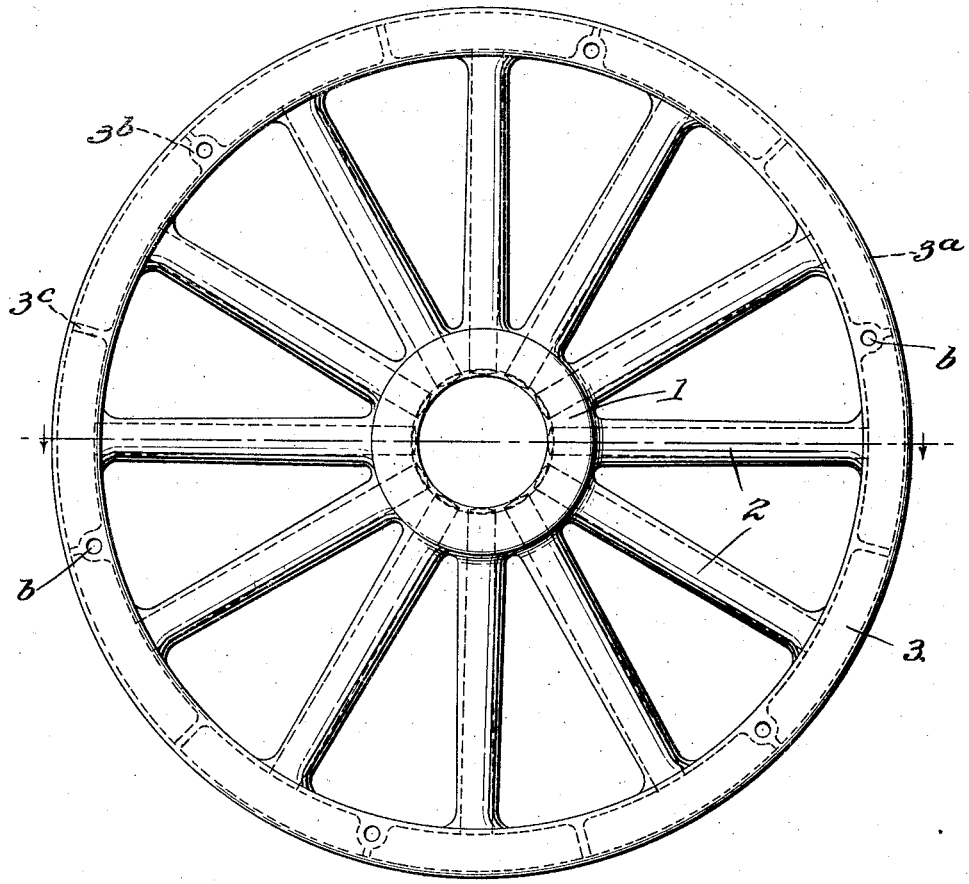

1,510,231

UNITED STATES PATENT OFFICE.

HARRY W. KELLER, OF PITTSBURGH, AND ALBERT T. KELLER, OF BETHLEHEM, PENNSYLVANIA.

APPARATUS FOR MAKING METALLIC VEHICLE WHEELS.

Application filed July 6, 1922. Serial No. 573,206.

*To all whom it may concern:*

Be it known that we, HARRY W. KELLER and ALBERT T. KELLER, citizens of the United States, and residents of Pittsburgh and Bethlehem, in the counties of Allegheny and Northampton, respectively, in the State of Pennsylvania, have invented certain new and useful Improvements in Apparatus for Making Metallic Vehicle Wheels, of which the following is a specification.

Our present invention relates to improved apparatus for molding metallic vehicle wheels, and the invention aims to provide apparatus by the means of which a metallic wheel having integral hollow hub, spoke and felly members may be economically and expeditiously manufactured without requiring the use of destructible cores such as sand cores, for example.

Our invention will be explained by aid of the accompanying drawings, in which:—

Figure 1. is a transverse sectional view through a molding apparatus constructed in accordance with our invention.

Fig. 2 is a section on line 2—2 of Fig. 1.

Fig. 3 is a transverse sectional view of the completed wheel, and

Fig. 4 is a plan view of the wheel.

Referring by reference characters to these drawings, we will first describe the wheel which our apparatus is designed to produce and which is shown in Figs. 3 and 4. This is shown as comprising a hub 1, spokes 2 and a felly 3, all formed by casting into a single integral structure. The spokes 2 are formed hollow as shown, and the bores of these spokes are continued through the hub member 1, thus imparting lightness and avoiding the use of unnecessary metal.

The felly is also made hollow, being specifically of channel shape with the outer peripheral edges of the side walls of the channel provided with inwardly facing flanges, as indicated at 3ª. These flanges form a relatively broad bearing seat for the customary metal tire carrying rim.

The apparatus for forming or casting the wheel above described comprises a mold such as shown in Figs. 1 and 2, in which 6 and 7 represent complementary mold sections, each having a mold cavity, or cavities shaped to conform approximately to one-half of the wheel to be cast therein. Preferably the mold member 6 has an annular flange or portion 6ª which overlaps the outer periphery of the mold member 7, which latter is held in place by clamps 4 secured by nuts 5 on the bolts 5ª tapped into the said member 6ª. The parting line of the mold formed by the members 6 and 7 preferably coincides with the center line of the spokes. Located centrally within the hub forming cavity of the mold, is a core plug 9 which forms the bore of the hub. The mold sections 6 and 7 are provided with annular rebates or grooves 6ᵇ and 7ᵇ which form the mating cavities in which the felly is cast, the mating spoke forming cavities 6ᶜ and 7ᶜ radiating from the mating hub cavities to the felly forming cavities and corresponding in number to the number of spokes which it is desired that the wheel shall have.

The mold member 6 is provided with a plurality of radial openings or holes 6ᵈ in line with the spoke cavities, through which are passed the spoke cores 8, which extend inwardly through the hub cavity and have their inner ends seated in peripheral recesses in the hub core 9, which hub core forms the bore of the hub, the spoke cores being capable of being readily inserted in the groove by a radial or lengthwise movement. In order to form the felly in the shape shown without necessitating the use of a destructible core, we provide collapsible segmental cores which extend between adjacent spoke cores and which comprise central flat arc-shaped members 10, and are interposed between side members 10ª which have arc-shaped enlargements *a*. When the three sections forming a felly core piece are assembled, they form a core piece which, roughly speaking, is of T-shape in cross section, the head of the T serving to shape the interior walls of the hollow portion of the felly, and the shank of the T defining the inner edges of the flanges 3ª and said shank being held in place by the corresponding mold faces between which it is clamped, as shown in Fig. 1. The molten metal may be supplied to the mold in any suitable manner as for instance, by providing the mold with a neck 7ᵈ within which is provided a refractory lining 11, the central bore or passage of which connects by branch ports 11ª with the hub forming cavity. After the wheel has been cast by supplying the mold with molten metal from any suitable source and in any desirable manner, the spoke cores may be readily withdrawn, and upon separating the mold members the felly forming cores may be readily withdrawn by first removing the central core sections 10 whereafter the sections 10ᵃ may be individually withdrawn, it being understood that the flange or enlarged portions $a$ of the sections are of such size as to permit their passage through the space between the inturned flanges 3ᵃ of the felly.

By the use of molding apparatus such as above described, we are enabled to construct a one-piece wheel, having hollow hub, spoke and channel shaped felly members without the use of any sand cores or cores of a nature which must be destroyed in order to remove them from the mold. Such a wheel may be made of approximately the same dimensions as the wooden wheels customarily used on motor vehicles and can be fitted out with the same attachments, such as hub centers, demountable rims, brake drums and the like.

The mold and core parts hereinbefore described, would of course, be constructed of a suitable material adapted to permanently retain its form so as to be capable of re-use for an indefinite period, such for example, as a metal adapted for the purpose.

The webs or side walls of the felly channel are provided with cross lugs or webs 3ᵇ at the points where the bolt holes $b$ are formed to receive the usual demountable rim bolts, and intermediate bracing webs 3ᶜ may also be provided, these webs being formed by correspondingly recessed portions $c$ and $c'$ in the arc shaped forming portion $a$.

Having thus described our invention, what we claim is:—

1. Apparatus for casting metal wheels having channel shaped fellies with inwardly turned flanges comprising complementary mold members having mating hub, spoke and felly forming cavities, and collapsible sectional cores cooperating with said cavities.

2. Apparatus for casting metal wheels having channel shaped fellies with inwardly turned flanges comprising complementary mold members having mating hub, spoke and felly forming cavities, and collapsible sectional cores cooperating with said cavities, said cores comprising central ring members, and side ring members having oppositely extending annular ribs.

3. Apparatus for casting metal wheels having channel shaped fellies with inwardly turned flanges comprising complementary mold members having mating hub, spoke and felly forming cavities, and collapsible sectional cores cooperating with said cavities, said cores comprising central ring members, and side ring members having oppositely extending annular ribs, all of said rings being sectional.

4. Apparatus for casting hollow metal wheels comprising complementary mold sections having mating hub, spoke and felly forming cavities, radially disposed core members lying in the spoke cavities and extending through the felly cavities, and collapsible sectional felly cores in the felly cavities between said spoke cores.

5. Apparatus for casting metal wheels comprising complementary mold members having mating hub, spoke and felly forming cavities, one of said mold members having an annular flange overlying the periphery of the other and having radial openings aligning with said spoke cavities, spoke cores removably held in said radial openings and extending through said spoke cavities, and collapsible felly cores in said felly cavities between the spokes.

6. Apparatus for making metal wheels comprising complementary mold members having mating hub, spoke and felly forming cavities, one of said mold members having an annular flange overlying the periphery of the other and having radial openings aligning with said spoke cavities, spoke cores removably held in said radial openings and extending through said spoke cavities, and collapsible felly cores in said felly cavities, between the spokes, each of said felly cores comprising a central member and two side members, said side members having lateral felly forming ribs, and all of said members extending beyond the felly cavity and being clamped between said mold members.

In testimony whereof, we affix our signatures.

HARRY W. KELLER.
ALBERT T. KELLER.